W. MUSSEHL.
Potato-Digger.
No. 16,184.  Patented Dec. 9, 1856.
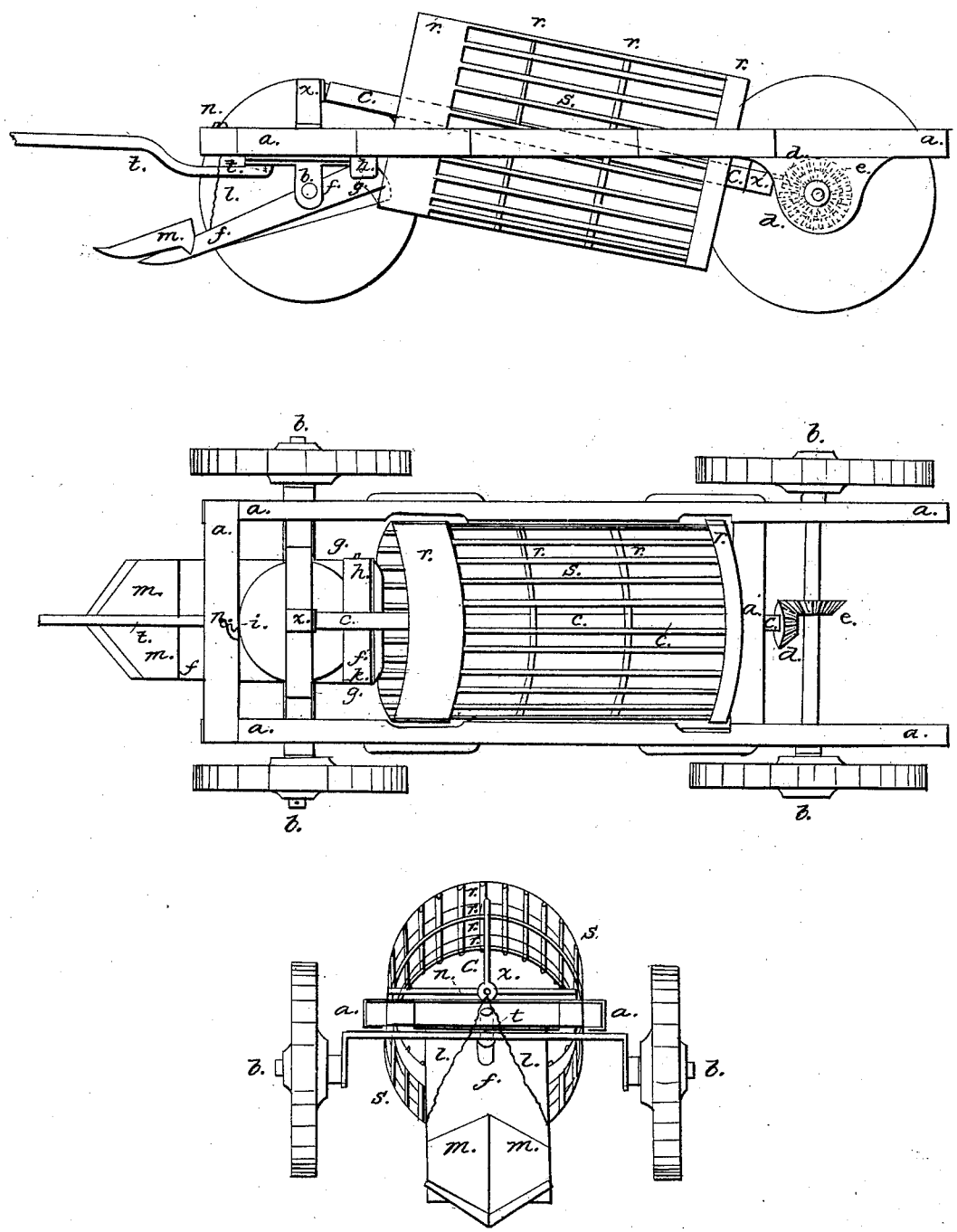

UNITED STATES PATENT OFFICE.

WM. MUSSEHL, OF NEW YORK, N. Y.

IMPROVEMENT IN POTATO-DIGGERS.

Specification forming part of Letters Patent No. 16,184, dated December 9, 1856.

*To all whom it may concern:*

Be it known that I, WILLIAM MUSSEHL, of the city, county, and State of New York, have invented a new and Improved Machine for Digging, Cleaning, and Harvesting Potatoes; and I do hereby declare that the following is a full and exact description thereof, reference being had to the accompanying drawings, and to the letters of reference marked thereon.

The nature of my invention consists in raising the earth containing the potatoes by means of an inclined adjustable shovel into a rotating cylindrical screen or separator, through which the earth falls, while the potatoes are discharged at the end of the machine.

To enable others skilled in the art to make and use my invention, I will proceed to describe its construction and operation, and for that purpose I refer to accompanying drawings, of which—

Figure 1 represents a side view, the wheels toward the side of the spectator supposed to be taken off in order to show the details of construction more distinct; Fig. 2, a ground plan; Fig. 3, a front view, the letters marked thereon referring in all figures to the same parts.

Letters $a$ design a strong wooden frame with cross-pieces. This frame rests on the axles $b$ of two pairs of wheels, the hind wheels being fastened to their axle, which bears the cog-wheel $e$; $x$, journal-box attached above, and $x'$ another one below the cross-piece of the frame, so as to receive and hold the shaft $o$ of the cylindrical separator under an inclination, so that its fore part reaches some inches higher than its back part.

The separator S is open on both ends and constructed of strong wire drawn parallel to the shaft, and secured to hoops which rest on the shaft $c$ by spokes. To the lower end of the shaft is attached the cog-wheel $d$, so as to work with the wheel $e$ and bring the separator into revolution. An inclined shovel, $f$, with turned-up sides is secured so as to reach at least as far as one inch within the foremost part of the separator, but without touching its periphery. This shovel hangs on pivots $g$, turning on bearers $h$, connected with the frame, and ought to be long enough to penetrate sufficiently deep into the ground for reaching the potatoes. In order to adjust its inclination, I suspend it further on a chain, $l$, hanging down from the foremost cross-piece of the frame, where it may be elevated or lowered and kept in the desired position by a pin, $n$. The fore part of the shovel contains two mold-boards, $m\ m$, arranged in the manner shown by the drawings. The shovel, when it reaches the separator, may be curved, so as to run concentric with the circumference of S.

The axle of the fore wheels is movable around a pin which connects it with the frame cross-piece $a$, to allow convenient turning after a furrow of the field has been worked. A team is attached at $t$, Figs. 1 and 2.

Having described the construction and arrangement of this machine, I will proceed to describe its operation.

A team being attached at $t$, the machine is driven forward over the potato-ground. Previously the shovel $f$ has been properly adjusted in its inclination according to the depth of the crop and to the nature of the soil. The mold-boards $m\ m$ catch the stalks and weeds and throw them on both sides of the furrow opened by the progress of the shovel. The shovel itself by its progress and momentum carries the soil with the potatoes upward on its inclined plane till it falls into the separator S, which is kept in rotation by the cog-wheels $d$ and $e$. In passing the separator the earth is completely loosened from the potatoes and falls out through the interstices between the wires, while the potatoes, rolling toward the lowest part of the separator, at last fall out, when they may be removed for convenient transportation. After a furrow has been finished the shovel is raised above the ground by drawing the chain $l$ upward, then the machine may be turned to another furrow, and, after readjusting the shovel, the work may be resumed.

What I claim, and desire to secure by Letters Patent, is—

The revolving separator S, in combination with the adjustable inclined shovel $f$ and mold-boards $m$, arranged and operated in the manner and for the purpose set forth.

WILLIAM MUSSEHL.

Witnesses:
C. HARTMAN,
JUL. E. SCHWABE.